United States Patent [19]

Peuterbaugh

[11] 4,022,539
[45] May 10, 1977

[54] BORING BAR STRUCTURE

[75] Inventor: Bruce G. Peuterbaugh, Mount Clemens, Mich.

[73] Assignee: J. P. Tool, Inc., Warren, Mich.

[22] Filed: May 23, 1975

[21] Appl. No.: 580,157

[52] U.S. Cl. .................................. 408/188; 279/6; 408/150

[51] Int. Cl.² ................ B23B 29/034; B23B 29/18

[58] Field of Search .......... 408/150, 151, 187, 188, 408/16; 279/6, 18, 1 A

[56] References Cited

UNITED STATES PATENTS

| 1,880,742 | 10/1932 | Bosworth | 408/151 |
|---|---|---|---|
| 2,392,809 | 1/1946 | Cote | 279/6 X |
| 2,461,579 | 2/1949 | Thomas | 279/6 |

Primary Examiner—Othell M. Simpson
Assistant Examiner—Z. R. Bilinsky
Attorney, Agent, or Firm—Whittemore, Hulbert & Belknap

[57] ABSTRACT

Boring bar structure including an adapter having an axis of rotation, an eccentric bore through said adapter having a longitudinal axis parallel to but offset from the axis of rotation of the adapter, adapter spline structure in one end of the bore concentric with the bore, a cylindrical boring bar body having concentric spline structure on one end thereof adapted to mesh with the adapter spline structure in adjusted relative angular positions, the one end of the boring bar body being adapted to fit within the eccentric bore in the adapter with the spline structures in mesh, whereby a cutting tool secured to the other end of the boring bar body may be adjusted radially of the axis of rotation of the adapter on axial movement of the boring bar body within the eccentric bore in the adapter and relative angular movement of the adapter and boring bar body and subsequent meshing of the spline structure with the adapter and bar in a different angular relation.

The boring bar body has an angular, axially central external groove therearound which has a V-shaped cross section which is within the adapter with the one end of the boring bar body in the adapter bore. A set screw is provided extending through the adapter into the bore to engage one face of the angular groove and thus set the relative axial position of the boring bar body and adapter with the splined structures engaged. A limiting screw extends perpendicularly through the adapter into the bore and into the groove in the boring bar body whereby relative axial movement between the boring bar body and the adapter is limited to that necessary to engage and disengage the spline structures for relative angular adjustment of the boring bar body and adapter to radially adjust a cutting tool secured to the other end of the boring bar body.

4 Claims, 7 Drawing Figures

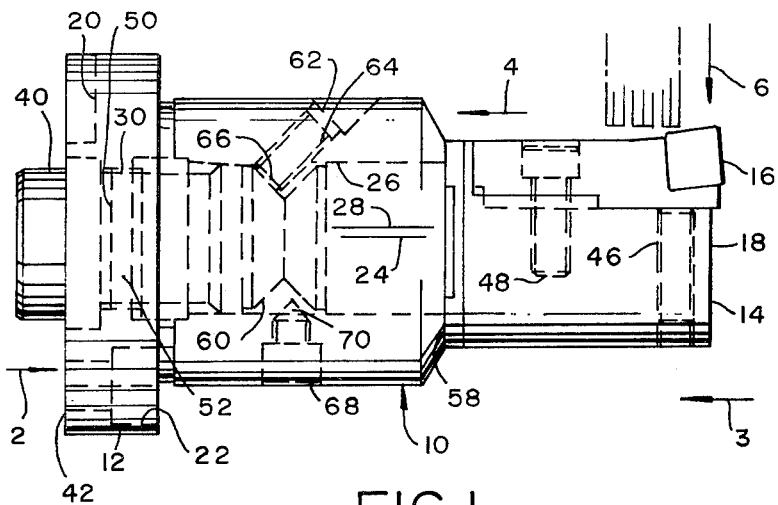
FIG.1
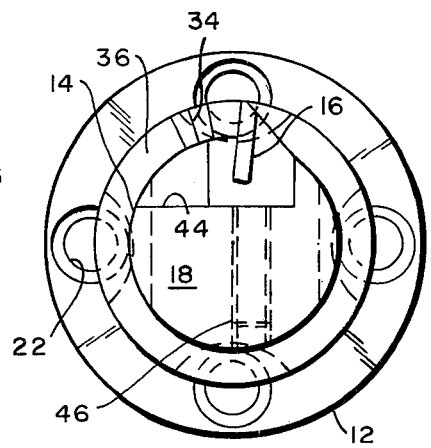
FIG.3
FIG.4
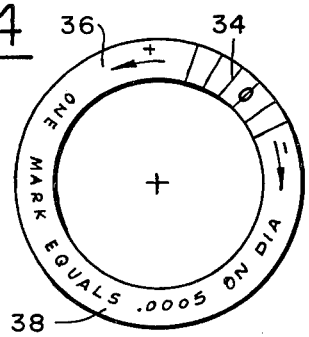
FIG.2
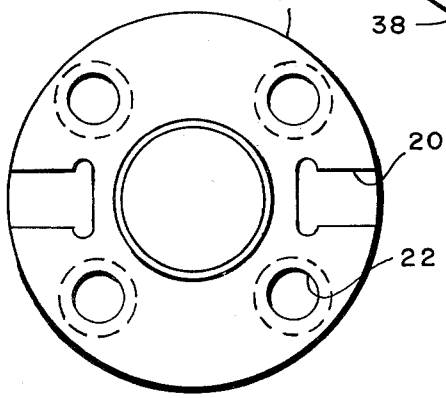
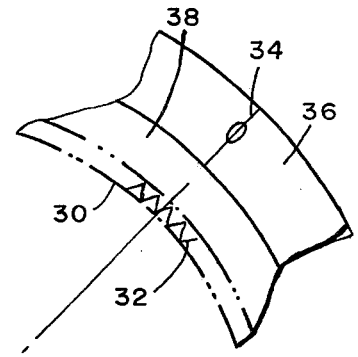
FIG.5
FIG.6
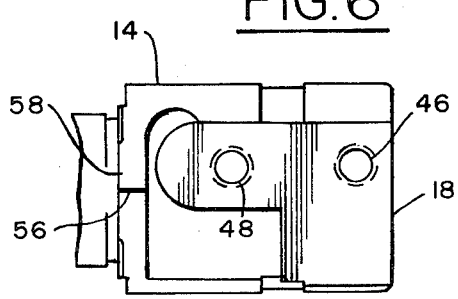
FIG.7
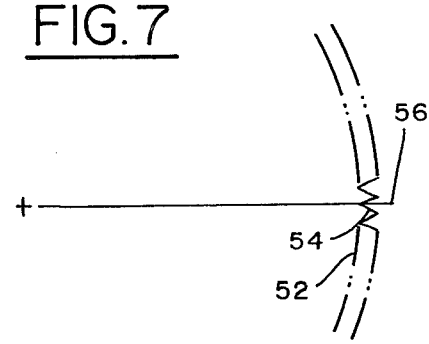

BORING BAR STRUCTURE

BACKGROUND OF THE INVENTION

1. Field of the Invention

The invention relates to boring bars and refers more specifically to boring bars wherein radial adjustment of a cutting tool is accomplished on rotation of a boring bar body to which the cutting tool is secured in an eccentric bore in an adapter which is rotated about a center line parallel to but offset from the center line of the bore.

2. Description of the Prior Art

In prior boring bars wherein radial adjustment of a cutting tool has been accomplished by rotation of a boring bar body within an eccentric bore in an adapter, radial adjustment of the tool has required precise angular positioning of the boring bar body with respect to the adapter. Sometimes in the past, pre-stressed bearings have been provided between the boring bar body and the adapter in the bore to improve the ease of angular adjustment between the boring bar body and adapter. However, such adjustment must still be very precisely made and is subject to being disturbed during machining if the boring bar and adapter are not locked in adjusted position. If the boring bar body and adapter are locked in each adjusted position, the adjustment may be lost during the locking procedure. Also, the locking procedure takes time additional to the already undesirable time required for making the checking fine radial adjustment of the cutting tool.

SUMMARY OF THE INVENTION

In accordance with the invention, a boring bar is provided by which a cutting tool is radially adjusted in very fine adjustments as, for example, .00025 inch increments or finer, by means of changing the angular position of a boring bar body within an eccentric bore in an adapter. The adapter and boring bar body have meshing spline structures engageable in a plurality of predetermined relative angular positions of the boring bar body and adapter whereby each adjustment is discrete and predetermined.

A set screw is provided operable between the boring bar body and adapter for axially setting the boring bar within the adapter in any relative angularly adjusted position, and a limiting screw is provided extending through the adapter into an angular groove provided on the boring bar body to permit limited relative axial movement of the boring bar within the bore in the adapter.

BRIEF DESCRIPTION OF THE DRAWINGS

FIG. 1 is an elevation view of a boring bar constructed in accordance with the invention.

FIG. 2 is an end view of the boring bar of the invention, taken in the direction of arrow 2 in FIG. 1.

FIG. 3 is an end view of the boring bar of the invention taken in the direction of arrow 3 in FIG. 1.

FIG. 4 is a view of one end surface of the adapter of the boring bar illustrated in FIG. 1, taken in the direction of arrow 4 in FIG. 1.

FIG. 5 is a diagrammatic view of the relation of the spline structure of the adapter of the boring bar of FIG. 1 with respect to the graduations illustrated in FIG. 4.

FIG. 6 is a partial elevation view of the boring bar body of the boring bar structure illustrated in FIG. 1, taken in the direction of arrow 6 in FIG. 1 and showing an indicator line thereon.

FIG. 7 is a diagrammatic view of the spline structure of the boring bar body showing its relation to the indicator line illustrated in FIG. 6.

DESCRIPTION OF THE PREFERRED EMBODIMENT

The boring bar 10 illustrated best in FIG. 1 includes an adapter 12 and a boring bar body 14. A cutting tool 16 is secured to one end 18 of the boring bar body 14.

More specifically, the adapter 12 is provided with keyways 20 and bolt openings 22 which aid in the securing of the adapter 12 to a boring machine spindle or the like, whereby the adapter 12 may be rotated about the axis of rotation 24 thereof in the usual manner. The adapter 12 is further provided with an eccentric bore 26 therethrough which has a longitudinal axis 28 which is parallel to but offset from the axis 24. An angular internal spline structure 30 is provided within the bore 26 and concentric therewith. The adapter spline structure 30 includes the V-shaped axially extending individual splines 32 within the bore 26 as shown best in FIG. 5.

Graduations 34 are provided on the surface 36 at the end 38 of the adapter 12, as best shown in FIG. 5. As shown best in FIG. 5, the point of one of the splines 32 is aligned with the zero graduation on the surface 36.

A plug 40 is provided at the end 42 of the adapter 12 to close the bore 26 and may be rigidly secured in place as by a shrink fit after the spline structure 30 has been provided within the bore 26.

The boring bar body member 14 is provided with the recess 44, as shown best in FIG. 3, into which the cutting tool 16 is secured by convenient means such as the rough diameter adjustment screw 46 and bolt 48. The other end 50 of the boring bar body 14 is provided with spline structure 52 which includes external, V-shaped cross section, axially extending splines 54 which are concentric with the cylindrical boring bar 14, as best shown in FIG. 7.

An indicator line 56 is provided on the boring bar body 14 centrally thereof, adjacent to abutment surface 58 on the boring bar body 14. The abutment surface 58 serves as a setting surface for the boring bar 14 to establish a reference axial position between the boring bar 14 and adapter 12.

One valley between two individual splines 54 is angularly aligned with the indicator line 56, as shown best in FIG. 7. Thus, in one relative angular position of the boring bar body 14 and the adapter 12, the zero graduation on the adapter is exactly aligned with the indicator line on the boring bar body.

Further, as the boring bar is angularly moved in either direction from the position in which the zero graduation is aligned with the indicator line, the radial position of the cutting tool 16 will be increased or decreased a predetermined amount as, for example, .00025 of an inch per predetermined graduations based on the eccentric position of the boring bar body 14 relative to adapter 12.

The boring bar body 14 is further provided with a centrally located angular groove 60 in the exterior surface thereof which has a V-shaped cross section as shown best in FIG. 1. A set screw 62 extends obliquely through a threaded opening 64 in the adapter 12, substantially perpendicularly to the surface 66 of the groove 60, as shown best in FIG. 1, whereby the boring bar body 14 may be locked in any selected relative angular position between the boring bar and adapter 12, permitted by the spline structures of the adapter and boring bar body with the surface 58 in engagement with the end 38 of the adapter 12.

Further, a limiting screw 68 having a conical end 70 extends into the bore 26 substantially perpendicularly thereto. The screw 68 limits the relative axial movement between the boring bar body and the adapter to that movement necessary to permit engagement and disengagement of the spline structures 30 and 52 to permit angular adjustment of the boring bar body within the bore 26 in adapter 12 with the set screw 62 loosened or removed. The screw 68 prevents accidental removal of the boring bar body 14 from the adapter 12.

Thus, in overall operation, when it is desired to change the diameter bored by a boring tool 16 by a slight amount, or when it is desired to adjust the boring tool radially due to wear thereof, the set screw 62 is removed or loosened sufficiently to permit relative axial movement between the boring bar body 14 and the adapter 12 to disengage the spline structures 30 and 52. The boring bar body 14 is rotated in the eccentric bore 26 a number of graduations depending on the amount of adjustment of the cutting tool 16 required in accordance with the relation between the graduations 34 and indicator line 56 and the splines 32 and 54 of the spline structures 30 and 52. The spline structures are then meshed with a new relative angular position on movement of the boring bar body 14 back into the bore 26 in adapter 12 to engage the abutting surface 58 with the end 38 of the adapter 12, and the set screw 62 is re-positioned to secure exact axial location of the cutting tool 16 relative to the adapter 12.

While one embodiment of the present invention has been disclosed in detail, it will be understood that other embodiments and modifications of the invention are contemplated. It is therefore the intention to include in the invention all such modifications and embodiments of the invention as are defined by the appended claims.

What I claim as my invention is:

1. Boring bar structure comprising an adapter having an axis of rotation, a bore extending through the adapter parallel to the axis of rotation, the axis of generation of which bore is offset from the axis of rotation of the adapter, spline structure within said bore adjacent one end thereof concentric with said bore, a boring bar body one end of which is slidably positioned within the bore in the adapter having an axis of rotation parallel to the axis of rotation of the adapter and on the same center line as the axis of generation of the bore, said boring bar body having concentric spline structure on the one end thereof adapted to mate with the spline structure in the bore in different relative angular positions of the adapter and boring bar body, said boring bar body having larger and smaller diameter portions forming a shoulder therebetween and being dimensioned so that with the shoulder positioned against one end of the adapter at the other end of the bore the spline structures are engaged, means for holding the shoulder on the boring bar body against the one end of the adapter in any relative angular position between the adapter and boring bar body, comprising an annular groove about the boring bar body which is within the adapter with the spline structures in mesh having a V-shaped cross section, and a set screw extending diagonally through the adapter from one side thereof into the bore and into engagement with one face of the V-shaped cross section of the groove, and separate limiting means permitting limited axial movement of the boring bar body within the adapter whereby the spline structure on the boring bar body may be disengaged from the spline structure on the adapter and complete removal of the boring bar body from the adapter is prevented, comprising a limit screw having a conical point thereon extending through the adapter into the bore therein and into the groove for engagement with a face of the groove to limit axial movement of the boring bar body in at least one direction within the adapter and a plug adjacent said spline structure in the bore closing the one end of the bore in the adapter.

2. Structure as set forth in claim 1 wherein graduations are provided about one end of the adapter in predetermined alignment with the adapter spline structure and an indicator line is provided on the boring bar body in predetermined alignment with the spline structure thereon.

3. Structure as set forth in claim 2 wherein the adapter spline structure is a series of longitudinally extending V-shaped notches and the point of one of the notches extends through a zero graduation on the one end of the adapter.

4. Structure as set forth in claim 2 wherein the boring bar body spline structure is a series of longitudinally extending V-shaped notches and one of the valleys between a pair of V-shaped notches is aligned with the indicator line on the boring bar body.

* * * * *